United States Patent
Komatsubara et al.

(10) Patent No.: US 12,442,414 B2
(45) Date of Patent: Oct. 14, 2025

(54) OIL-IMPREGNATED SINTERED BEARING AND FLUID DYNAMIC BEARING DEVICE PROVIDED WITH THE BEARING

(71) Applicant: NTN CORPORATION, Osaka (JP)

(72) Inventors: Shinji Komatsubara, Mie (JP); Fuyuki Ito, Mie (JP); Toshiaki Niwa, Mie (JP)

(73) Assignee: NTN CORPORATION, Osaka (JP)

( * ) Notice: Subject to any disclaimer, the term of this patent is extended or adjusted under 35 U.S.C. 154(b) by 96 days.

(21) Appl. No.: 18/280,782

(22) PCT Filed: Feb. 21, 2022

(86) PCT No.: PCT/JP2022/006942
§ 371 (c)(1),
(2) Date: Sep. 7, 2023

(87) PCT Pub. No.: WO2022/190836
PCT Pub. Date: Sep. 15, 2022

(65) Prior Publication Data
US 2024/0141953 A1    May 2, 2024

(30) Foreign Application Priority Data
Mar. 12, 2021    (JP) .................. 2021-040488

(51) Int. Cl.
*F16C 33/10*    (2006.01)
*F16C 17/10*    (2006.01)
*F16C 33/12*    (2006.01)

(52) U.S. Cl.
CPC .......... *F16C 33/104* (2013.01); *F16C 17/107* (2013.01); *F16C 33/128* (2013.01)

(58) Field of Classification Search
CPC .... F16C 17/026; F16C 17/102; F16C 17/107; F16C 33/104; F16C 33/128
See application file for complete search history.

(56) References Cited

U.S. PATENT DOCUMENTS

| | | | |
|---|---|---|---|
| 6,316,856 B1 * | 11/2001 | Kusaki | F16C 33/107 310/90 |
| 6,608,410 B2 * | 8/2003 | Sato | H02K 23/04 310/67 R |
| 8,864,380 B2 * | 10/2014 | Kurimura | F16C 35/02 384/107 |

(Continued)

FOREIGN PATENT DOCUMENTS

| | | |
|---|---|---|
| JP | 10-306827 | 11/1998 |
| JP | 3607492 | 1/2005 |

(Continued)

OTHER PUBLICATIONS

International Search Report (ISR) issued May 17, 2022 in International (PCT) Application No. PCT/JP2022/006942.

*Primary Examiner* — James Pilkington
(74) *Attorney, Agent, or Firm* — Wenderoth, Lind & Ponack, L.L.P.

(57) ABSTRACT

An internal pore of a sintered metal bearing 8 is impregnated with a lubricating fluid, and a radial dynamic pressure generation portion 8a1 is formed on an inner peripheral surface 8a. An axial dimension L is 4.8 nm or less, a thickness dimension t is 0.5 mm or more and 1.5 nm or less, and a ratio L/D2 of the axial dimension L to an outer diameter dimension D2 is 0.24 or more and 0.6 or less.

8 Claims, 3 Drawing Sheets

(56) References Cited

U.S. PATENT DOCUMENTS

| | | | |
|---|---|---|---|
| 10,415,573 B2 * | 9/2019 | Komatsubara | F16C 33/104 |
| 2002/0009242 A1 | 1/2002 | Okamura et al. | |
| 2012/0217832 A1 * | 8/2012 | Kim | F16C 17/107 |
| | | | 384/114 |
| 2013/0251292 A1 | 9/2013 | Chen et al. | |
| 2016/0230769 A1 | 8/2016 | Komatsubara | |

FOREIGN PATENT DOCUMENTS

| | | |
|---|---|---|
| JP | 2006-125461 | 5/2006 |
| JP | 2007-24089 | 2/2007 |
| JP | 2015-64019 | 4/2015 |
| TW | 201339449 | 10/2013 |

\* cited by examiner

OIL-IMPREGNATED SINTERED BEARING AND FLUID DYNAMIC BEARING DEVICE PROVIDED WITH THE BEARING

TECHNICAL FIELD

The present invention relates to an oil-impregnated sintered bearing and a fluid dynamic bearing device provided with the bearing, and particularly to an oil-impregnated sintered bearing with a radial dynamic pressure generation portion and a fluid dynamic bearing device provided with the bearing.

BACKGROUND ART

The oil-impregnated sintered bearing is a bearing that is used by mating internal pores of a porous body formed of sintered metal with a lubricating oil, the lubricating oil impregnated in the internal pores oozes out to a sliding portion with a shaft with the relative rotation of the shaft inserted into the inner periphery to form an oil film and the oil-impregnated sintered bearing supports the rotation of the shaft via the oil film. Such a bearing is suitably used as a bearing device for a motor mounted on various electric devices including information devices, more specifically, as a bearing device for a spindle motor in a disk drive device for an HDD, a CD, a DVD, or a Blu-ray disk, for a fan motor incorporated in the disk drive device, a PC, or the like, or for a polygon scanner motor incorporated in a laser beam printer (LBP) because of its excellent rotation accuracy and quietness.

Further, a dynamic pressure generating portion such as dynamic pressure generating grooves nay be formed on at least one of the inner peripheral surface and the end surface in the axial direction of the oil-impregnated sintered bearing in order to further approve the silent property and increase the service life. Here, as a method for molding the dynamic pressure generating grooves, so-called dynamic pressure generating groove sizing is known. In this sizing, for example, a sintered body to be a bearing is pressed in the axial direction by an upper punch and a lower punch, and the sintered body is press-fitted into the inner periphery of a die, thereby biting the sintered body to a molding die of the outer periphery of the sizing pin inserted in advance into the inner periphery of the sintered body. As a result, the shape of the molding die, that is, the shape corresponding to the dynamic pressure generating grooves is transferred to the inner peripheral surface of the sintered body, and the dynamic pressure generating grooves as the radial dynamic pressure generation portion are formed (refer to, for example, Patent Literature 1).

Recently, along with the miniaturization and the reduction in thickness of information devices, miniaturization is also required for various motors mounted on the information devices. For example, a cooling fan motor used in a laptop computer or the like is thinned, and a beating device used in this motor is also required to be thinned. On the other hand, cooling performance is required to be equal to or higher than the cooling performance in the related art. Since the reduction in the thickness of the bearing device leads to a reduction in the bearing area, not only in a case where the size of the impeller (fan) is increased, but also in a case where the size of the impeller is maintained, the reduction in the bearing rigidity is likely to be caused by the reduction in the bearing area.

Here, Patent Literature 2 discloses an oil-impregnated sintered bearing in which a dynamic pressure generating groove arrangement region is provided on an inner peripheral surface, the oil-impregnated sintered bearing having an axial dimension of 6 mm or less and a density ratio of the entire bearing of 80% or more and 95% or less. In addition, it is disclosed that, with the beating according to the above configuration, since the density ratio of the entire bearing is made uniform as compared with that in the related art, sufficient bearing rigidity can be expected even in a case where the axial dimension is reduced by omitting the lubricating fluid reservoir (recessed portion) between the dynamic pressure generating groove arrangement regions in the related art.

CITATIONS LIST

Patent Literature

Patent Literature 1: Japanese Patent No. 3607492
Patent Literature 2: JP 2015-64019 A

SUMMARY OF INVENTION

Technical Problems

Recently, a cooling fan motor used in a laptop computer or the like has been further thinned, and the axial dimension of the bearing used for the motor has also been required to be further reduced. On the other hand, in a case where the axial dimension of the bearing is decreased, the area in which the radial dynamic pressure generation portion can be formed is decreased by that much, and the dynamic pressure that can be generated in the radial bearing clearance is also decreased. Therefore, it is difficult to support the shaft (the rotating body such as the impeller) with high accuracy, which may lead to a decrease in rotation accuracy (NRRO). For example, as disclosed in Patent Literature 2, it is possible to improve the bearing rigidity and the rotation accuracy by providing the thrust dynamic pressure generating grooves on both end surfaces of the bearing. However, in this case, the assembly of the fluid dynamic bearing device cannot be completed only by inserting the shaft of the rotating body into the bearing inner periphery, and extra jigs and processes are required. Therefore, there is a possibility that the assembly cost is increased.

In view of the above circumstances, a technical problem to be solved by the present invention is to achieve the reduction in thickness and the high rotation accuracy of a fluid dynamic bearing device without causing an increase in assembling cost.

Solutions to Problems

The problem is solved by the oil-impregnated sintered bearing according to the present invention. That is, the oil-impregnated sintered bearing is a sintered metal bearing obtained by compression-molding a metal powder into a tubular shape to form a green compact, and sintering the formed green compact, in which an internal pore is impregnated with a lubricating fluid and a radial dynamic pressure generation portion is formed on an inner peripheral surface, wherein an axial dimension L is 4.8 mm or less, a thickness dimension t is 0.5 mm or more and 1.5 mm or less, and a ratio L/D2 of the axial dimension L to an outer diameter dimension D2 is 0.24 or more and 0.6 or less.

The present inventors have found that, at the time of the above-described dynamic pressure generating groove sizing, even in a case where the axial dimension L of the sintered metal bearing is made smaller (to be 4.8 mm or less) than that in the related art, by setting the thickness dimension t of the bearing and the ratio L/D2 of the axial dimension L to the outer diameter dimension D2 within a predetermined numerical range, the press-fitting force into the tubular sintered body can be sufficiently transmitted, as the pressing force in the radial direction, to the surface layer portion of the inner peripheral surface of the bearing. The present invention has been made in view of the above findings, and in a case where the axial dimension L of the oil-impregnated sintered bearing is reduced (to be 4.8 mm or less) as compared with that in the related art, the thickness dimension t of the oil-impregnated sintered bearing is set within a range of 0.5 to 1.5 mm, and the bearing has a significantly flat shape (that is the ratio L/D2 of the axial dimension L to the outer diameter dimension D2 is set to a value: 0.24 to 0.6, which is significantly smaller than 1) as compared with that in the related art. By providing the bearing having such shape and size, for example, at the time of the above-described dynamic pressure generating groove sizing, regardless of the magnitude of the axial dimension L, the pressing force in the radial direction generated by the press-fitting into the die can be sufficiently transmitted to the surface layer portion of the inner peripheral surface of the sintered body to be the bearing. Therefore, even in a case where the axial dimension L is set to be smaller than that in the related art, the radial dynamic pressure generation portion (typically having a groove shape) can be accurately and stably formed, and required radial bearing performance can be stably exhibited. In addition, by setting the thickness dimension t to 0.5 mm or more, it is possible to secure the thrust bearing area required for the end surface of the bearing on one side in the axial direction. As a result, even in a case where the thrust bearing portion is provided only on one side of the bearing in the axial direction, excellent rotation accuracy can be exhibited, and thus, for example, the assembly of the fluid dynamic bearing device including the bearing can be performed at low cost only by wetting the shaft of the rotating body into the inner periphery of the oil-impregnated sintered bearing.

In the oil-impregnated sintered bearing according to the present invention, the density ratio may be 86% or more and 92% or less. The "density ratio" as used herein means a value (percentage) obtained by dividing the density of the porous body constituting the oil-impregnated sintered bearing by the density in a case where it is assumed that the porous body has no pores.

As described above, by setting the density ratio of the oil-impregnated sintered bearing to 86% or more, in particular, at the time of dynamic pressure generating groove sizing the press-fitting force into the die is sufficiently transmitted, as the pressing force in the radial direction, to the surface layer portion of the inner peripheral surface of the bearing. Therefore, the dynamic pressure generating grooves having a sufficient depth can be transferred and formed on the inner peripheral surface of the bearing. In addition, by suppressing the density ratio to 92% or less, an excessive load on the sizing mold can be suppressed, so that favorable dynamic pressure generating groove sizing can be stably and continuously performed. In particular, in a case where the bearing has the axial dimension L and the flat shape described above and the density ratio is set within the range described above, the variation in the density ratio in the sintered body to be the bearing can be further reduced (to be 1% or less), so that high rotation performance can be stably exhibited. Specifically, the density ratio of the surface layer portion can be set to such an extent that the lubricating oil or the like can be appropriately and uniformly oozed out into the bearing clearance while preventing the dynamic pressure from escaping from the bearing surface. In addition, the density ratio of the region excluding the surface layer portion (the region on the inner side of the surface layer portion) can be set so that the impregnation amount of the lubricating oil or the like by the inner region is appropriate and uniform.

In the oil-impregnated sintered bearing according to the present invention, a ratio D2/D1 of the outer diameter dimension D2 to an inner diameter dimension D1 may be 1.5 or more and 3.0 or less.

As described above, by setting the ratio D2/D1 of the outer diameter dimension D2 to the inner diameter dimension D1 to 1.5 or more and 3.0 or less, the biting property of the sizing pin with respect to the inner peripheral surface, and the moldability of the dynamic pressure generating grooves and the like can be secured. In addition, by determining the ratio D2/D1 of the inner diameter dimension D1 and the outer diameter dimension D2 together with the preferable numerical range of the thickness dimension t described above, it is possible to more effectively apply the pressing force in the radial direction due to the press-fitting of the die to the surface layer portion of the inner peripheral surface of the sintered body.

In the oil-impregnated sintered bearing according to the present invention, an inner diameter dimension D1 may be 1.5 mm or more and 2.0 mm or less.

As described above, also by setting the inner diameter dimension D1 to 1.5 mm or more, the biting property of the sizing pin with respect to the inner peripheral surface, and the moldability of the dynamic pressure generating grooves and the like can be secured. In addition, by determining the preferable numerical range of the inner diameter dimension D1 together with the preferable numerical range of the thickness dimension t described above, a sufficient amount of spring back can be generated in the sintered body (porous body). This makes it possible to reliably form the dynamic pressure generating grooves on the inner peripheral surface even in a case where the dynamic pressure generating grooves have a corresponding depth (about 1 to 4 mm), for example. In addition, by suppressing the inner diameter dimension D1 to 2.0 mm or less, it is possible to avoid a situation in which the outer diameter dimension D2 and the thickness dimension t are increased more than necessary, and to reliably transmit the pressing force in the radial direction generated by the press-fitting into the die to the surface layer portion of the inner peripheral surface.

In the oil-impregnated sintered bearing according to the present invention, a thrust dynamic pressure generation portion may be formed on an end surface on one side in an axial direction, and an end surface on another side in the axial direction may forma flat shape.

As described above, with the oil-impregnated sintered bearing according to the present invention, since it is possible to achieve both the reduction in thickness and high rotation accuracy of the fluid dynamic bearing device, sufficient bearing rigidity can be exhibited even in a case where the thrust dynamic pressure generation portion is formed only on one end surface in the axial direction as described above. Therefore, for example, the assembly of the shaft (rotating body) with respect to the bearing can be completed only by inserting the shaft of the rotating body into the inner periphery of the bearing, and the fluid dynamic bearing device can be assembled at low cost.

The oil-impregnated sintered bearing according to the above description can be suitably provided as a fluid dynamic bearing de-ice including, for example, the oil-impregnated sintered beating; a housing having an inner periphery to which the oil-impregnated sintered bearing is fixed; a rotating body having a shaft inserted into an inner periphery of the oil-impregnated sintered bearing; and a radial bearing portion that supports the shaft in a non-contact manner in a radial direction with a film of the lubricating fluid formed in a radial bearing clearance between an inner peripheral surface of the oil-impregnated sintered bearing and an outer peripheral surface of the shaft by a dynamic pressure action of the radial dynamic pressure generation portion.

The fluid dynamic bearing device according to the present invention may further include a first theist bearing portion that supports the shaft in a non-contact manner in a thrust direction with the film of the lubricating fluid formed in a thrust bearing clearance between an end surface of the rotating body on the other side in the axial direction and an end surface of the oil-impregnated sintered bearing on one side in the axial direction, the end surface of the rotating body on the other side and the end surface of the oil-impregnated sintered bearing on one side facing each other in the thrust direction.

In this case, in the fluid dynamic bearing device according to the present invention, a theist dynamic pressure generation portion may be provided on the end surface of the oil-impregnated sintered bearing on one side in the axial direction, which faces a disk portion of a hub portion as the rotating body in the thrust direction.

The fluid dynamic bearing device according to the present invention may further include a second thrust bearing portion that supports an end portion of the shaft on the other side in the axial direction, in a contact manner in the thrust direction with an end surface of the housing on one side in the axial direction.

As described above, by providing the first thrust bearing portion between the rotating body and the oil-impregnated sintered bearing which face each other in the thrust direction, and providing the second thrust bearing portion that supports the shaft in a contact manner between the shaft and the housing similarly facing each other in the thrust direction, it is possible to exhibit sufficient bearing rigidity in the that direction while making the oil-impregnated sintered bearing as simple as possible. In this case, the thrust dynamic pressure generation portion can be molded with high accuracy by providing the thrust dynamic pressure generation portion on the end surface of the oil-impregnated sintered bearing on one side in the axial direction, the end surface facing the disk portion of the hub portion as the rotating body in the thrust direction. Therefore, very excellent thrust bearing performance can be exhibited.

The fluid dynamic bearing device according to the above description can achieve the reduction in thickness and high rotation accuracy of the fluid dynamic bearing device without causing an increase in assembling cost as described above, and thus can be suitably provided as, for example, a motor including the fluid dynamic bearing device.

Advantageous Effects of Invention

According to the present invention, it is possible to achieve the reduction in thickness and the high rotation accuracy of a fluid dynamic bearing device without causing an increase in assembling cost.

DESCRIPTION OF EMBODIMENTS

Hereinafter, embodiments of the present invention will be described with reference to the drawings. In the following description, a disk portion side of a hub portion is referred to as an "upper side" and a bottom portion side of a housing is referred to as a "lower side" as viewed from the oil-impregnated sintered bearing. Of course, the vertical direction does not limit the actual installation mode and usage mode of the product.

Figure 1:
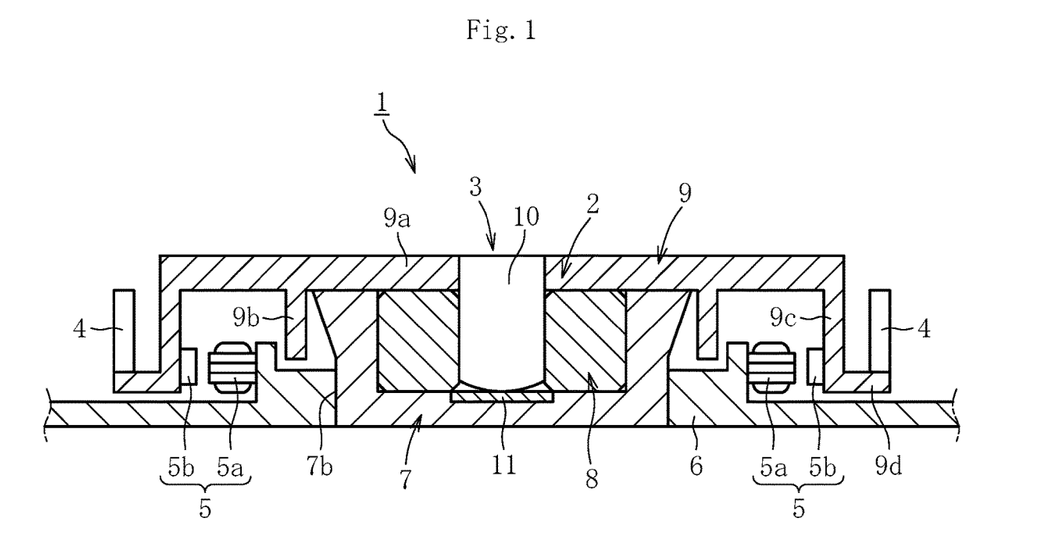
FIG. 1 is a cross-sectional view of a fan motor according to an embodiment of the present invention.

FIG. 1 conceptually illustrates a configuration example of a fan motor 1 according to the present embodiment. The fan motor 1 includes a thud dynamic bearing device 2, a plurality of fans 4 provided in a rotating body 3 of the fluid dynamic bearing device 2, and a drive unit 5 for rotating the fans 4 integrally with the rotating body 3. The drive unit 5 includes, for example, a coil 5a and a magnet 5b opposed to each other via a gap in a radial direction, and in the present embodiment, the coil 5a is fixed to a base portion 6 as the fixed side of the fan motor 1, and the magnet 5b is fixed to the rotating body 3 as the rotating side of the fan motor 1.

In the fan motor 1 having the configuration described above, in a case where the coil 5a is energized the magnet 5b rotates by the excitation force between the coil 5a and the magnet 5b, and by this rotation, the plurality of fans 4 erected on the outer peripheral edge of the rotating body 3 rotate integrally with the rotating body 3. By this rotation, each fan 4 generates an airflow in a direction corresponding to its shape (here, for example, an air flow radially outward), and an airflow directed from the upper side to the lower side in the axial direction of the fan motor 1 is secondarily generated by being drawn into the airflow. By generating the airflow around the fan motor 1 in this manner, an information device (not illustrated) to which the fan motor 1 is attached can be cooled.

When an air flow is generated in the axial direction of the fan motor 1 as described above, a force (reaction force) opposite to the airflow is generated in the rotating body 3 of the fluid dynamic bearing device 2. A magnetic force (repulsive force) in a direction to cancel the reaction force acts between the coil 5a and the magnet 5b, and a thrust load generated by a difference in magnitude between the reaction force and the magnetic force acts on thrust bearing portions T1 and T2 (refer to FIG. 2 to be described later) of the fluid dynamic bearing device 2. The magnetic force in the direction to cancel the reaction force can be generated, for example, by arranging the coil 5a and the magnet 5b to be shifted in the axial direction (detailed illustration is omitted). During the rotation of the rotating body 3, a radial load acts on the shaft 10 of the fluid dynamic bearing device 2 described later. This radial load acts on radial bearing portions R1 and R2 of the fluid dynamic bearing device 2.

Figure 2:
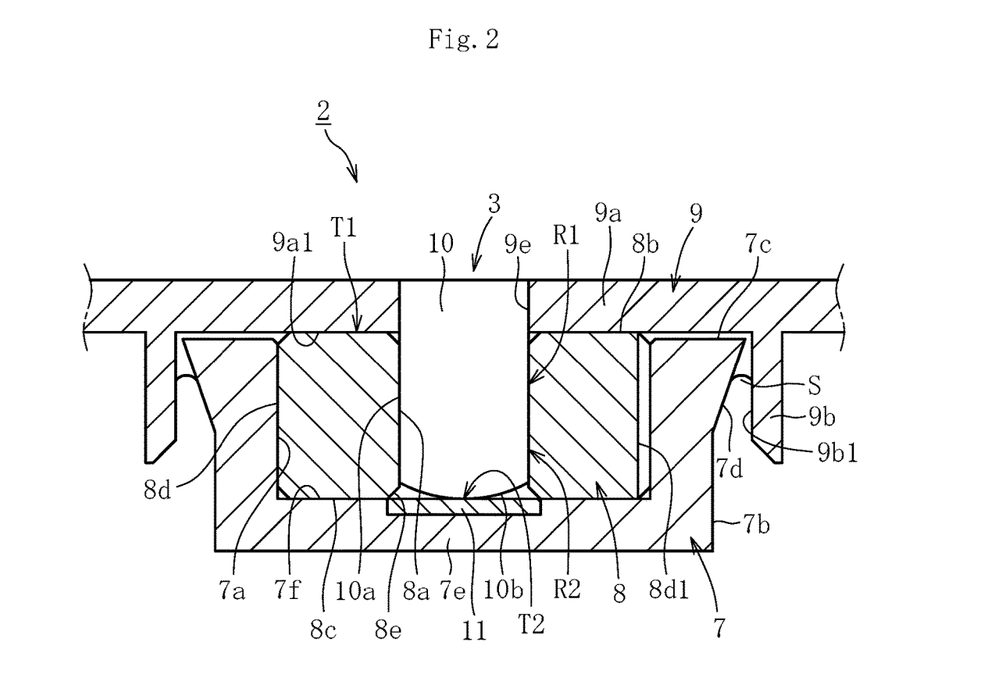
FIG. 2 is a cross-sectional view of a fluid dynamic bearing device illustrated in FIG. 1.

FIG. 2 illustrates a cross-sectional view of the fluid dynamic bearing device 2 incorporated in the fan motor 1. The fluid dynamic bearing device 2 includes a housing 7, an oil-impregnated sintered bearing 8 fixed to an inner periphery of the housing 7, and the rotating body 3 that rotates relative to the oil-impregnated sintered bearing 8.

The rotating body 3 has a hub portion 9 disposed on the upper end opening side of the housing 7, and the shaft 10 inserted into the inner periphery of the oil-impregnated sintered bearing 8.

As illustrated in FIGS. 1 and 2, the hub portion 9 includes a disk portion 9*a* that covers the upper end opening side of the housing 7, a first tubular portion 9*b* that extends from the disk portion 9*a* downward in the axial direction, a second tubular portion 9*c* that is positioned radially outside the first tubular portion 9*b* and extends from the disk portion 9*a* downward in the axial direction, and a flange portion 9*d* that further extends radially outward from the lower end of the second tubular portion 9*c* in the axial direction. The disk portion 9*a* faces one end surface (upper end surface 8*b*) of the oil-impregnated sintered bearing 8 fixed to the inner periphery of the housing 7. The plurality of fans 4 are provided integrally with the hub portion 9 so as to stand upright from the outer peripheral edge of the flange portion 9*d*.

In the present embodiment, the shaft 10 is formed separately from the hub portion 9, and has an upper end fixed to an attachment hole 9*e* provided in the hub portion 9. Here, the shaft 10 has an outer peripheral surface 10*a* having a constant outer diameter dimension, and has a lower end portion 10*b* having, for example, a partial spherical shape continuous with the lower end of the outer peripheral surface 10*a*. That is, the shaft 10 has a shape that can be inserted into the inner periphery of the oil-impregnated sintered bearing 8 from one side in the axial direction. Of course, the shaft 10 and the hub portion 9 may be integrally formed of the same material. Alternatively, one of the shaft 10 and the hub portion 9 formed of different materials may be formed as an insert component, and the other may be formed by injection molding of metal or resin.

The housing 7 has a shape in which the upper end is open and the lower end is closed. The oil-impregnated sintered bearing 8 is fixed to an inner peripheral surface 7*a* of the housing 7, and an outer peripheral surface 7*b* of the housing 7 is fixed to the base portion 6 (refer to FIG. 1). The facing distance in the axial direction between an upper end surface 7*c* of the housing 7 and a lower end surface 9*a*1 of the disk portion 9*a* of the hub portion 9 is larger than the facing distance between the upper end surface 8*b* of the oil-impregnated sintered bearing 8 and the lower end surface 9*a*1 of the disk portion 9*a*, and in this case, the facing distance is set to a size that can be regarded as not substantially affecting an increase in lost torque during rotational driving.

On the upper side of the outer periphery of the housing 7, a tapered sealing surface 7*d* of which the outer diameter dimension is increased as it goes upward is formed. Between the tapered sealing surface 7*d* and an inner peripheral surface 9*b*1 of the first tubular portion 9*b*, an annular sealing space S is formed in which the facing distance in the radial direction is gradually reduced from the closing side (lower side) toward the opening side (upper side) of the housing 7. The sealing space S communicates with an outer diameter side of a thrust bearing clearance of the first thrust bearing portion T1 to be described later during the rotation of the shaft 10 and the hub portion 9, and allows a lubricating oil to flow between the sealing space S and a bearing inner space including each bearing clearance. In a state in which the internal pores and the bearing inner space of the oil-impregnated sintered bearing 8 are filled with the lubricating oil, the filling amount of the lubricating oil is adjusted such that the oil surface (gas-liquid interface) of the lubricating oil is always maintained in the sealing space S (refer to FIG. 2).

In a case where the housing 7 has the seal structure as described above, the coil 5*a* is positioned radially outside the first tubular portion 9*b* of the hub portion 9, and the first tubular portion 9*b* and the coil 5*a* are arranged so as to partially overlap each other in the axial direction. As a result, the reduction in thickness (reduction in axial dimension) of the housing 7 and the fluid dynamic bearing device 2 is obtained.

In the present embodiment, a bottom portion 7*e* of the housing 7 is provided with a thrust receiving portion 11 that receives the lower end portion 10*b* of the spherical shaft 10. That is, the thrust receiving portion 11 is always in contact with the lower end portion 10*b* of the shaft 10 in the completed state of the fluid dynamic bearing device 2, and can rotatably support the shaft 10. It is preferable to set the position of the thrust receiving portion 11 in the vertical direction with respect to a bearing contact surface 7*f* of the housing 7 such that the contact position between the shaft 10 and the thrust receiving portion 11 is, for example, within a region of an inner chamfered portion 8*e* of the oil-impregnated sintered bearing 8 in the vertical direction.

The material and composition of the housing 7 are arbitrary in principle, and for example, a known material such as resin or metal can be appropriately adopted according to the fixing means for fixing the oil-impregnated sintered bearing 8 described later to the housing 7.

Figure 3:
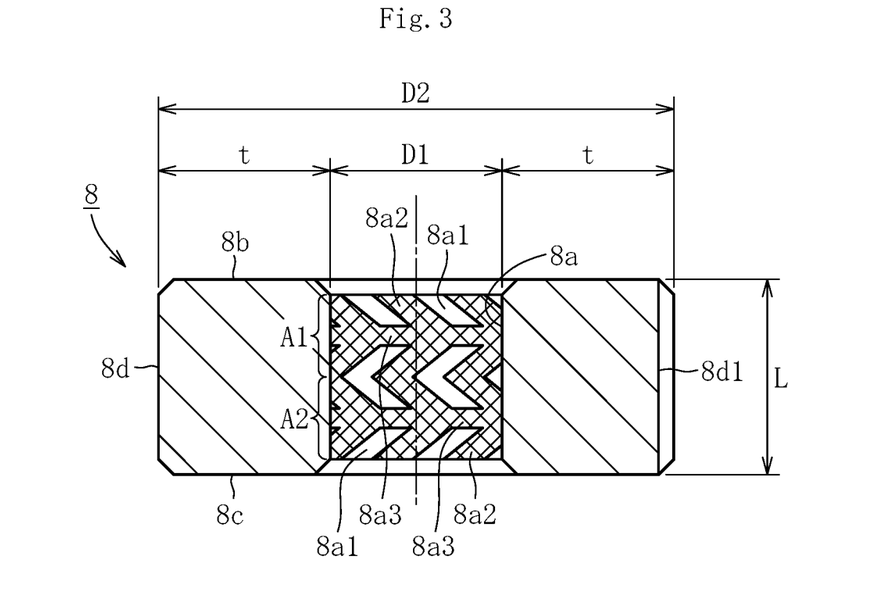
FIG. 3 is a cross-sectional view of an oil-impregnated sintered bearing illustrated in FIG. 2.
Figure 4:
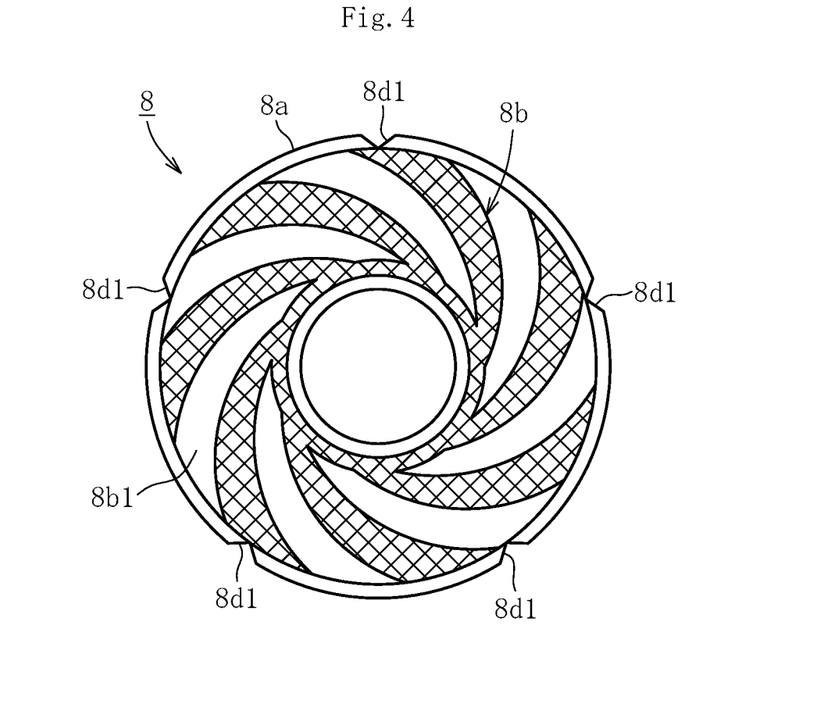
FIG. 4 is a plan view of the oil-impregnated sintered bearing illustrated in FIG. 2.

The oil-impregnated sintered bearing 8 is a sintered metal porous body obtained by compression-molding and sintering a predetermined raw material powder, and has a cylindrical shape. In the present embodiment, a cylindrical shape is formed as illustrated in FIG. 4 and the like. A region in which a plurality of dynamic pressure generating grooves 8*a*1 are arranged as the radial dynamic pressure generation portion is formed on the entire surface or a part of an inner peripheral surface 8*a* of the oil-impregnated sintered bearing 8. In the present embodiment, as illustrated in FIG. 3, the dynamic pressure generating groove 8*a*1 arrangement region is formed by arranging, in a herringbone shape, a plurality of dynamic pressure generating grooves 8*a*1 inclined at a predetermined angle with respect to the circumferential direction, inclined hill portions 8*a*2 that partition the dynamic pressure generating grooves 8*a*1 in the circumferential direction, and band portions 8*a*3 (both the inclined hill portions 8*a*2 and the band portions 8*a*3 are cross-hatched in FIG. 3.) that extend in the circumferential direction and partition the dynamic pressure generating grooves 8*a*1 in the axial direction, and the dynamic pressure generating groove 8*a*1 arrangement region is formed at two locations continuously in the axial direction. In this case, both the upper dynamic pressure generating groove arrangement region A1 and the lower dynamic pressure generating groove arrangement region A2 are formed axially symmetrically with respect to a center line in the axial direction (an imaginary line connecting centers in the axial direction of the band portions 8*a*3 in the circumferential direction), and the axial dimensions thereof are equal to each other.

A region in which a plurality of dynamic pressure generating grooves 8*b*1 are arranged as the thrust dynamic pressure generation portion is formed on the entire surface or a part of the upper end surface 8*b* of the oil-impregnated sintered bearing 8. In the present embodiment, for example, as illustrated in FIG. 4, a region in which the plurality of spirally extending dynamic pressure generating grooves 8*b*1 are arranged in the circumferential direction is formed. In this case, the direction of the spiral of the dynamic pressure generating grooves 8b1 is set to a direction corresponding to the rotation direction of the rotating body 3. In a state where the fluid dynamic bearing device 2 illustrated in FIG. 2 is rotationally driven, the thrust bearing clearance of the first thrust bearing portion T1 described later is formed between the dynamic pressure generating groove 8b1 arrangement region having the configuration described above and the lower end surface 9a1 of the disk portion 9a of the facing hub portion 9.

Figure 5:
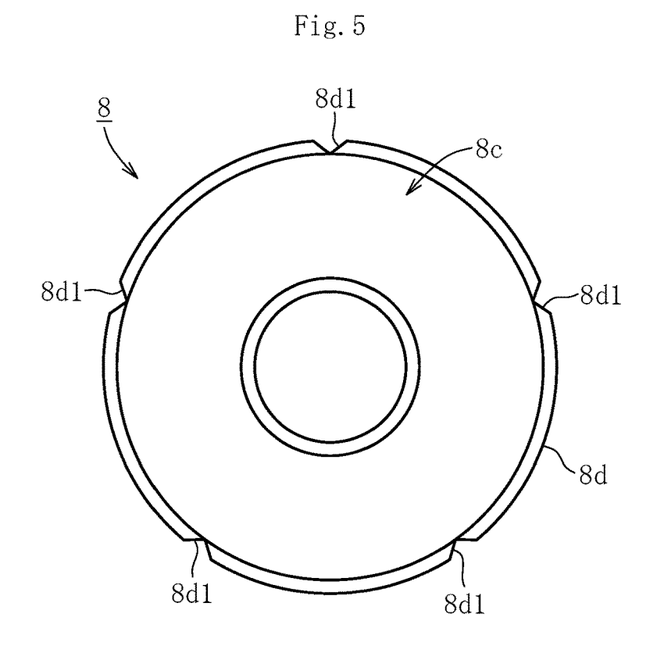
FIG. 5 is a bottom view of the oil-impregnated sintered bearing illustrated in FIG. 2.

A thrust dynamic pressure generation portion is not formed on a lower end surface 8c of the oil-impregnated sintered bearing 8. That is, in the present embodiment, as illustrated in FIG. 5, the lower end surface 8c has a flat shape. The lower end surface 8c is in contact with the housing 7 on the outer side of the thrust receiving portion 11 in the radial direction of the housing 7. In this case, the position of the bearing contact surface 7f of the housing 7 in the vertical direction is appropriately set within a range in which a space between the upper end surface 8b of the oil-impregnated sintered bearing 8 and the lower end surface 9a1 of the hub portion 9 can function as the thrust bearing clearance.

One or more (five in the present embodiment) axial grooves 8d1 are formed on an outer peripheral surface 8d of the oil-impregnated sintered bearing 8 (refer to, for example, FIG. 4). In a state where the oil-impregnated sintered bearing 8 is fixed to the housing 7, the axial groove 8d1 forms a flow path of the lubricating oil between the axial groove 8d1 and the inner peripheral surface 7a of the housing 7 (refer to FIG. 2).

Next, various dimensions of the oil-impregnated sintered bearing 8 will be described with reference to FIG. 3. An axial dimension L (distance between both end surfaces 8b and 8c in the axial direction) of the oil-impregnated sintered bearing 8 is set to 4.8 mm or less, preferably 3.0 mm or less, and more preferably 1.8 mm or less from the viewpoint of reducing the thickness of the fluid dynamic bearing device 2 and the fan motor 1. On the other hand, from the viewpoint of securing the required radial bearing rigidity, the axial dimension L is set to 0.8 mm or more, and preferably 1.1 mm or more.

An inner diameter dimension D1 (to be precise, the inner diameter dimension of the band portion 8a3 that becomes the smallest diameter portion together with the inclined hill portion 8a2 in the inner peripheral surface 8a) of the oil-impregnated sintered bearing 8 is arbitrary as long as a thickness dimension t of the oil-impregnated sintered bearing 8 is set within a range to be described later, but the inner diameter dimension D1 is desirably 1.2 mm or more, and more desirably 1.5 mm or more, from the viewpoint of securing biting property of the sizing pin with respect to the inner peripheral surface 8a during dynamic pressure generating groove sizing. On the other hand, from the viewpoint of avoiding a situation in which it is difficult to reliably transmit the press-fitting force at the time of dynamic pressure generating groove sizing to the surface layer portion of the inner peripheral surface 8a due to an excessive increase in the thickness dimension t as a result, the inner diameter dimension D1 is desirably 2.5 mm or less, and more desirably 2.0 mm or less.

An outer diameter dimension D2 of the oil-impregnated sintered bearing 8 is arbitrary as long as the thickness dimension t of the oil-impregnated sintered bearing 8 and the ratio L/D2 of the axial dimension L to the outer diameter dimension D2 are set within a range to be described later, but the outer diameter dimension D2 is desirably 2.5 mm or more and more desirably 3.0 mm or more from the viewpoint of the balance between the necessary inner diameter dimension D1 and thickness dimension t. From the same viewpoint, the outer diameter dimension D2 is desirably 5.0 mm or less, and more desirably 4.5 mm or less.

The ratio D2/D1 of the outer diameter dimension D2 to the inner diameter dimension D1 is preferably set to 1.5 or more and 3.0 or less from the viewpoint of securing the biting property of the sizing pin with respect to the inner peripheral surface 8a and the moldability of the dynamic pressure generating grooves 8a1.

The thickness dimension $t\{=(D2-D1)/2\}$ of the oil-impregnated sintered bearing 8 is preferably set to 0.5 mm or more, for example, from the viewpoint of securing a thrust bearing area required for the upper end surface 8b. On the other hand, the thickness dimension t is preferably set to 1.5 mm or less from the viewpoint of enabling sufficient pressing force from the die to be transmitted to the surface layer portion of the inner peripheral surface of the sintered body at the time of dynamic pressure generating groove sizing.

In addition, the ratio L/D2 of the axial dimension L to the outer diameter dimension D2 is set to 0.24 or more and 0.6 or less from the viewpoint of the transmission efficiency of the radial pressing force to the surface layer portion of the inner peripheral surface of the sintered body at the time of dynamic pressure generating groove sizing.

Next, the composition of the oil-impregnated sintered bearing 8 will be described. The oil-impregnated sintered bearing 8 is obtained by compression-molding and sintering a raw material powder containing one of the copper-based powder and the iron-based powder in the largest amount and the other in the second largest amount. In other words, the porous body of the oil-impregnated sintered bearing 8 substantially has a composition containing one of copper and iron as a main component and the other as a second component (the second most common component). The copper-based powder here includes not only a pure copper powder but also a copper alloy powder. Pure copper includes not only copper having a purity of 100% but also 99.99% or more of copper that is industrially recognized as pure copper. Similarly, the iron-based powder here includes not only pure iron powder but also iron alloy powder such as stainless steel. The pure iron here includes not only iron having a purity of 100% but also 99.99% or more of iron that is industrially recognized as pure iron. As long as the above-described composition (powder compounding ratio) is established, the type and compounding ratio of powders to be the third and subsequent components are arbitrary.

As the composition (powder compounding ratio) of the raw material powder, for example, [copper-based powder: 50 to 70 wt %, iron-based powder: 30 to 48 wt %, tin powder: 0 to 5%] can be applied, and as a specific example, [pure iron powder of 140 mesh or less: 38 to 42 wt %, tin powder of 330 mesh or less: 1 to 3%, pure copper powder of 200 mesh or less: balance] can be mentioned.

Next, the density ratio of the oil-impregnated sintered bearing 8 will be described. The density ratio of the entire bearings of the oil-impregnated sintered bearing 8 is set to 80% or more and 95% or less, and preferably 86% or more and 92% or less. The density ratio can be set by, for example, adjusting the material, particle size (distribution), compounding ratio, and the like of the metal powder as a raw material. The variation in the density ratio in this case can be evaluated using the density ratio and the porosity at which a certain correlation is recognized. Here, the porosity is represented by a volume ratio (percentage) of pores occupied per unit volume of the bearing, and exhibits a substantially negative correlation (correlation coefficient of −1) with the density ratio as a rule of thumb.

In addition, the surface opening ratio of the inner peripheral surface 8a, in particular, the inner peripheral surfaces of the inclined hill portion 8a2 and the band portion 8a3 serving as radial bearing surfaces is adjusted to, for example, 2% or more and 15% or less. The surface opening ratio can be adjusted by, for example, rotational sizing described later.

The oil-impregnated sintered bearing 8 having the above-described configuration is manufactured through, for example, a powder molding step S1, a sintering step S2, a dynamic pressure generating groove sizing step S3, and an oil impregnation step S4. Hereinafter, details of each step will be described with an example in which a dimension sizing step S21 and a rotational sizing step S22 are provided after the sintering step S2 and before the dynamic pressure generating groove sizing step S3.

(S1) Powder Molding Step

First, a raw material powder as a material of the oil-impregnated sintered bearing 8 to be a final product is prepared, and this is compression-molded into a predetermined shape by die press molding. Specifically, although not illustrated, the compression molding of the raw material powder is performed using a molding die including a die, a core pin inserted and disposed in a hole of the die, a lower punch configured to be movable upward and downward with respect to the die, and an upper punch configured to be relatively displaceable (movable upward and downward) with respect to both the die and the lower punch, the lower punch and the upper punch being disposed between the die and the core pin. In this case, a space defined and formed by the inner peripheral surface of the die, the outer peripheral surface of the core pin, and the upper end surface of the lower punch is filled with the raw material powder, the upper punch is lowered in a state where the lower punch is fixed, and the raw material powder in the filled state is pressurized in the axial direction. Then, the raw material powder is compressed to a predetermined axial dimension by lowering the upper punch to a predetermined position while pressurizing the raw material powder, and thus a green compact is molded. In this case, the axial dimension of the green compact can be set within an appropriate range by controlling the distance between the lower end surface of the upper punch and the upper end surface of the lower punch, more specifically, controlling the bottom dead center of the upper punch according to the axial dimension (more strictly, setting in consideration of the subsequent sintering treatment and dimensional change due to various types of sizing) to be targeted.

(S2) Sintering Step

After the green compact is obtained as described above, the green compact is sintered at a temperature corresponding to the type of the raw material powder (the melting point of the metal as the main component) to obtain a sintered body.

(S21) Dimension Sizing Step and (S22) Rotational Sizing Step

Then, the dimension sizing is performed on the sintered body to correct the outer diameter dimension the inner diameter dimension, and the axial dimension of the sintered body to dimensions according to the final product, and the surface opening ratio of the inner peripheral surface 8a is adjusted to a ratio suitable as a fluid dynamic bearing (for example, the above-described numerical range: 2 to 15%). In this stage, the predetermined dynamic pressure generating groove 8a1 arrangement regions A1 and A2 are not yet formed on the inner peripheral surface 8a of the sintered body. Similarly, although not illustrated, the predetermined dynamic pressure generating groove 8b1 arrangement region is not yet formed on the upper end surface 8b of the sintered body.

(S3) Dynamic Pressure Generating Groove Sizing Step

By performing predetermined dynamic pressure generating groove sizing on the sintered body obtained through the series of steps described above, the dynamic pressure generating groove 8a1 arrangement regions A1 and A2 are formed on the inner peripheral surface 8a of the sintered body. Although not illustrated, the molding device here includes a die having a press-fitting hole of a sintered body, a sizing pin disposed to be insertable into the press-fitting hole of the die, a lower punch configured to be relatively movable upward and downward with respect to the die, and an upper punch configured to be movable upward and downward with respect to both the die and the lower punch, the lower punch and upper punch being disposed between the die and the sizing pin. In this case, the inner diameter dimension of the press-fitting hole of the die is appropriately set according to the press-fitting margin of the sintered body to be sized. In addition, a molding die having a shape corresponding to the dynamic pressure generating groove arrangement regions A1 and A2 (FIG. 3) of the inner peripheral surface 8a to be molded is provided on the outer peripheral surface of the sizing pin, and a molding die having a shape corresponding to the dynamic pressure generating groove 8b1 arrangement region (FIG. 4) of the upper end surface 8b to be molded is provided on the lower end surface of the upper punch.

Next, an example of dynamic pressure generating groove sizing using the molding device will be described. First, in a state where the sintered body is disposed on the upper end surface of the die, the upper punch and the sizing pin are lowered from above the sintered body. As a result, the sizing pin is inserted into the inner periphery of the sintered body, and the molding die provided on the outer periphery of the sizing pin faces the inner peripheral surface of the sintered body in the radial direction. Then, after the molding die has reached the predetermined position in the axial direction of the inner peripheral surface, only the upper punch is continuously lowered to press the upper end surface of the sintered body. As a result, the sintered body is pushed into the press-fitting hole of the die, the outer peripheral surface of the sintered body is pressed, and the inner peripheral surface of the sintered body bites into the molding die of the sizing pin inserted into the inner periphery in advance. In addition, from this state, the upper punch is further lowered, the sintered body is clamped between the upper punch and the lower punch, and the sintered body in a state where the deformation in the outer diameter direction is restrained by the die is pressed in the axial direction, so that the inner peripheral surface further bites into the molding die. In this manner, the shape of the molding die is transferred to the inner peripheral surface of the sintered body and the dynamic pressure generating groove 8a1 arrangement regions A1 and A2 are formed on the inner peripheral surface. In this case, in a case where the molding die provided on the lower end surface of the upper punch bites into the upper end surface of the sintered body, the shape of the molding die of the upper punch is transferred to the upper end surface, and the arrangement region of the corresponding dynamic pressure generating grooves 8b1 is formed.

After the predetermined dynamic pressure generating groove 8a1 and 8b1 arrangement regions are formed on the inner peripheral surface and the upper end surface of the sintered body in this manner, the die is lowered relative to the lower punch to release the restrained state of the sintered body by the die. As a result, the sintered body generates spring back in the outer diameter direction, and the sintered body can be removed from the sizing pin. In this case, since the required spring back amount is such a size that the molding die provided in the sizing pin is not caught in the inner peripheral surface (particularly, dynamic pressure generating groove gal arrangement regions A1 and A2) of the sintered body in the axial direction after sizing, the thickness dimension t of the sintered body is set in consideration of the groove depth (several μm) of the dynamic pressure generating grooves $8a1$ to be molded. In the present embodiment, by setting the thickness dimension t to 0.5 mm or more and 1.5 mm or less as described above, it is possible to mold the dynamic pressure generating grooves $8a1$ having a necessary depth and pull out the sizing pin subjected to the molding from the sintered body without being caught after sizing.

(S4) Oil Impregnation Step

By impregnating the internal pores of the sintered body obtained as described above with the lubricating oil as a lubricating fluid, the oil-impregnated sintered bearing 8 is completed.

Here, as the lubricating oil, various lubricating oils can be used, and for example, an ester-based lubricating oil having a small evaporation rate and a small reduction in viscosity at a low temperature, a fluorine-based lubricating oil having more excellent resistance than the ester-based lubricating oil, or the like is suitably used. From the viewpoint of kinematic viscosity, for example, a lubricating oil having a kinematic viscosity at 40° C. of 20 cSt or more and 170 cSt or less and a kinematic viscosity at 100° C. of 2 cSt or more and 50 cSt or less is suitably used.

The oil-impregnated sintered bearing 8 is fixed to the inner periphery of the housing 7 by known means such as press-fitting, press-fitting with adhesion, adhesion, and welding. Thereafter, the shaft 10 of the rotating body 3 is inserted into the inner periphery of the oil-impregnated sintered bearing 8 to complete the fluid dynamic bearing device 2. In this case, the interface of the lubricating oil is held in the sealing space S (refer to FIG. 2).

The above-described oil impregnation step S4 may be performed, for example, after the sintered body to be the oil-impregnated sintered bearing 8 is fixed to the inner periphery of the housing 7.

In the fluid dynamic bearing device 2 having the configuration described above, during the rotation of the shaft 10 (the rotating body 3), a region as the radial bearing surface of the inner peripheral surface $8a$ of the oil-impregnated sintered bearing 8 (dynamic pressure generating groove $8a1$ arrangement regions A1 and A2 at two upper and lower positions) faces the outer peripheral surface $10a$ of the shaft 10 with the radial bearing clearance interposed therebetween. As the shaft 10 rotates, the lubricating oil in the radial bearing clearance is pushed into the center side of each of the dynamic pressure generating groove $8a1$ arrangement regions A1 and A2 in the axial direction, and the pressure of the lubricating oil is increased in the region on the center side (here, the band portion $8a3$) in the axial direction. By such dynamic pressure action of the dynamic pressure generating grooves gal, the first radial bearing portion R1 and the second radial bearing portion R2 that rotatably support the shaft 10 in a non-contact manner in the radial direction are separated from each other in the axial direction.

An oil film of the lubricating oil is formed by the dynamic pressure action of the dynamic pressure generating grooves $8b$, in the thrust bearing clearance between the upper end surface $8b$ of the oil-impregnated sintered bearing 8 (region where the dynamic pressure generating grooves $8b1$ are arranged) and the lower end surface $9a1$ of the hub portion 9 facing the upper end surface $8b$. The pressure of the oil film forms the first thrust bearing portion T1 that supports the rotating body 3 in a non-contact manner in the thrust direction. In addition, the lower end portion $10b$ of the shaft 10 is rotatably supported in a contact manner by the thrust receiving portion 11 provided on the bottom portion $7e$ of the housing 7, thereby forming the second thrust bearing portion T2 that supports the rotating body 3 in a contact manner in the thrust direction.

As described above, in the oil-impregnated sintered bearing 8 according to the present embodiment, in a case where the axial dimension L is reduced (to be 4.8 mm or less) as compared with that in the related art, the thickness dimension t is set to 0.5 mm or more and 1.5 mm or less, and the oil-impregnated sintered bearing 8 has a significantly flat shape as compared with that in the related an. That is, the ratio L/D2 of the axial dimension L to the outer diameter dimension D2 of the oil-impregnated sintered bearing 8 is set to a value: 0.24 or more and 0.6 or less, which is significantly smaller than 1. By providing the oil-impregnated sintered bearing 8 having such shape and size, for example, at the time of the above-described dynamic pressure generating groove sizing, regardless of the magnitude of the axial dimension L the pressing force in the radial direction in the press-fitting force generated by the press-fitting into the die can be sufficiently transmitted to the surface layer portion of the inner peripheral surface of the sintered body to be the oil-impregnated sintered bearing 8. Therefore, even in a case where the axial dimension L is set to be smaller than that in the related art, the dynamic pressure generating groove $8a1$ arrangement regions A1 and A2 as the radial dynamic pressure generation portions can be accurately and stably formed, and required radial bearing perforce can be stably exhibited. In addition, by setting the thickness dimension t to 0.5 mm or more, it is possible to secure the thrust bearing area required for the upper end surface $8b$ of the oil-impregnated sintered bearing 8. As a result, even in a case where the thrust bearing portion (first thrust bearing portion T1) is provided only on the upper end surface $8b$ side of the oil-impregnated sintered bearing 8, excellent rotation accuracy can be exhibited, and thus, for example, the assembly of the fluid dynamic bearing device 2 including the oil-impregnated sintered bearing 8 can be performed at low cost only by inserting the shaft 10 of the rotating body 3 into the inner periphery of the oil-impregnated sintered bearing 8.

In addition, as in the present embodiment, by setting the density ratio of the porous body constituting the oil-impregnated sintered bearing 8 to 56% or more, in particular, at the time of dynamic pressure generating groove sizing, the press-fitting force into the die is sufficiently transmitted, as the pressing force in the radial direction, to the surface layer portion of the inner peripheral surface of the porous body (sintered body). Therefore, the dynamic pressure generating grooves gal having a sufficient depth can be transferred and formed on the inner peripheral surface of the sintered body. In addition, by suppressing the density ratio to 92% or less, an excessive load on the sizing mold can be suppressed, so that favorable dynamic pressure generating groove sizing can be stably and continuously performed. In particular, by setting the axial dimension L of the oil-impregnated sintered bearing 8 to 4.8 mm or less, setting the thickness dimension t to 0.5 mm or more and 1.5 mm or less, setting the ratio L/D2 of the axial dimension L to the outer diameter dimension D2 to 0.24 or more and 0.6 or less, and setting the density ratio to 86% or more and 92% or less, it is possible to hither reduce the variation in the density ratio of the porous body as the oil-impregnated sintered bearing 8 (to 1% or less). Therefore, high rotation performance can be stably exhibited. Specifically, it is possible to set the rotation accuracy (NRRO) at the time of using the bearing to 50 mu or less.

Although one embodiment of the present invention has been described above, the oil-impregnated sintered bearing and the fluid dynamic bearing device including the bearing according to the present invention are not limited to the above-described exemplary embodiment, and any embodiment can be adopted within the scope of the present invention.

Figure 6:
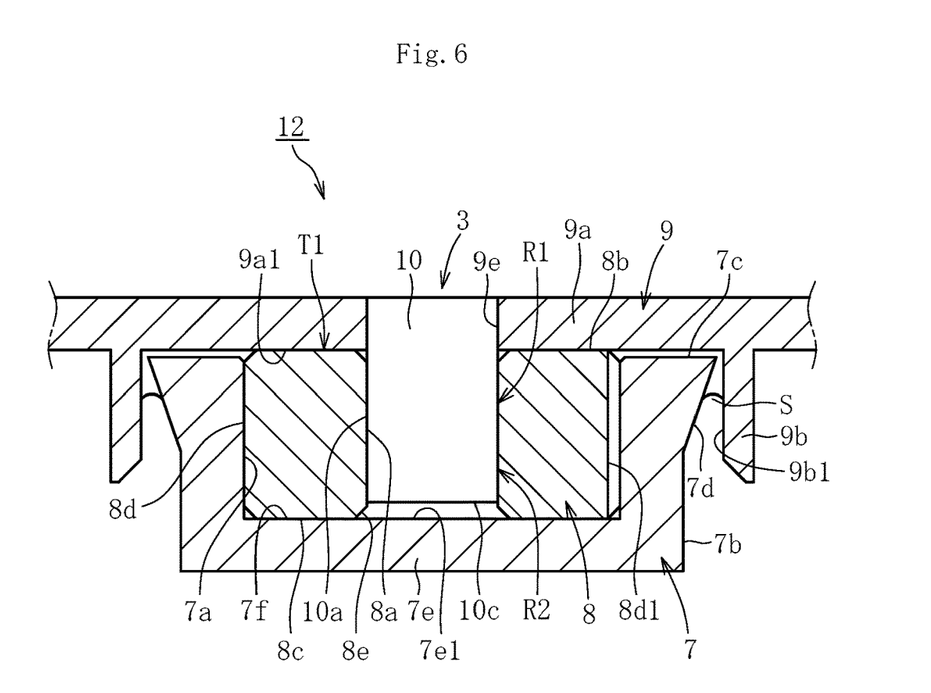
FIG. 6 is a cross-sectional view of a fluid dynamic bearing device according to another embodiment of the present invention.

FIG. 6 illustrates a cross-sectional view of a fluid dynamic bearing device 12 according to another embodiment of the present invention. As illustrated in FIG. 6, the fluid dynamic bearing device 12 in the present embodiment is different from the fluid dynamic bearing device 2 illustrated in FIG. 2 in that only the first thrust bearing portion T1 is provided. More specifically, in the fluid dynamic bearing device 2 according to the present embodiment, a predetermined thrust direction clearance is always present between the lower end surface 10c of the shaft 10 and the upper end surface 7e1 of the bottom portion 7e of the housing 7. Here, the size of the facing distance (thrust direction clearance) between the upper end surface 7e1 of the bottom portion 7e and the lower end surface 10c of the shaft 10 is larger than the facing distance between the upper end surface 8b of the oil-impregnated sintered bearing 8 and the lower end surface 9a1 of the disk portion 9a, and in this case, the facing distance is set to a size that can be regarded as not substantially affecting an increase in lost torque during rotational driving. Other configurations are the same as those of the fluid dynamic bearing device 2 illustrated in FIG. 2 and the like, and thus detailed description thereof is omitted.

Also in the fluid dynamic bearing device 12 according to the present embodiment, in a case where the axial dimension L is 4.8 mm or less, the thickness dimension t is set to 0.5 mm or more and 1.5 mm or less, and the ratio L/D2 of the axial dimension L to the outer diameter dimension D2 is set to a value: 0.24 or more and 0.6 or less, which is significantly smaller than 1. Therefore, the dynamic pressure generating groove gal arrangement regions A1 and A2 as the radial dynamic pressure generation portions can be accurately and stably formed, and required radial bearing performance can be stably exhibited. Further, since the thrust bearing area required for the upper end surface 8b of the oil-impregnated sintered bearing 8 can be secured, even in a case where the thrust bearing portion (first thrust bearing portion T1) is provided only on the upper end surface 8b side of the oil-impregnated sintered bearing 8, excellent rotation accuracy can be exhibited. Therefore, as illustrated in FIG. 6, even in a case where the lower end surface 10c of the shaft 10 is not supported in the thrust direction, sufficient thrust bearing performance can be exhibited, and cost reduction can be achieved by simplifying the lower end shape of the shaft 10 including omission of the thrust receiving portion 11.

Of course, for any one or both of the radial dynamic pressure generation portions (in FIG. 3, dynamic pressure generating groove 8a1 arrangement regions A1 and A2) which forms the radial bearing portions R1 and R2 between the radial dynamic pressure generation portion and the outer peripheral surface 109 of the shaft 10, it is possible to adopt a known radial dynamic pressure generation portion having a shape other than the dynamic pressure generating grooves, such as a so-called multi-arc shape, a step shape, or a wave shape.

In the above description, the housing 7 of the fluid dynamic bearing device 2 is fixed to the inner periphery of the base portion 6 of the fan motor 1. However, for example, the housing 7 may be directly attached to a base portion (not illustrated) of an information device to which the fan motor 1 is attached. Alternatively, the part corresponding to the base portion may be provided integrally with the housing 7.

In addition, in the above description, by arranging the magnet 5b and the coil 5a to be shifted in the axial direction, an external force for pressing the shaft 10 against the bottom portion 7e side of the housing 7 is applied to the shaft 10 (rotating body 3), but the means for applying such an external force to the shaft 10 is not limited to the above. Although not illustrated, for example, by arranging a magnetic member capable of attracting the magnet 5b to face the magnet 5b in the axial direction, the magnetic force can be applied to the rotating body 3. In a case where the thrust as the reaction force of the air blowing action is sufficiently large and the shaft 10 can be pressed downward only by this thrust, the magnetic force (magnetic attraction force) as the external force for pressing the shaft 10 downward may be omitted.

Although the case where the present invention is applied to the fluid dynamic bearing device 2 in which the rotating body 3 having the fan 4 is fixed to the shaft 10 has been described above, the present invention can also be preferably applied to the fluid dynamic bearing device 2 in which a disk hub having a disk mounting surface or a polygon mirror is fixed to the shaft 10 as the rotating body 3. That is, the present invention can be preferably applied not only to the fan motor 1 as illustrated in FIG. 1 but also to the fluid dynamic beating device 2 incorporated in other electric devices such as a spindle motor for a disk device and a polygon scanner motor for a laser beam printer (LBP).

REFERENCE SIGNS LIST

1 Fan motor
2, 12 Fluid dynamic bearing device
3 Rotating body
4 Fan
5 Drive unit
5a Coil
5b Dragnet
6 Base portion
7 Housing
7c Upper end surface
7d Sealing surface
8 Oil-impregnated sintered bearing
8a Inner peripheral surface
8a1 Dynamic pressure generating groove
8a2 Inclined hill portion
8a3 Band portion
8b Upper end surface
8b1 Dynamic pressure generating groove
8c Lower end surface
8d Outer peripheral surface
8d1 Axial groove
9 Hub portion
9a Disk portion
9a1 Lower end surface
9b, 9c Tubular portion
9d Flange portion 9e Attachment hole
10 Shaft
10a Outer peripheral surface
10b Lower end portion
10c Lower end surface
11 Thrust receiving portion
A1, A2 Dynamic pressure generating groove arrangement region
D1 Inner diameter dimension
D2 Outer diameter dimension
L Axial dimension
R1, R2 Radial bearing portion
S Sealing space
t Thickness dimension
T1, T2 Trust bearing portion

The invention claimed is:

1. An oil-impregnated sintered bearing comprising:
a sintered metal bearing obtained by compression-molding a metal powder into a tubular shape to form a green compact, and sintering the formed green compact;
a lubricating fluid impregnating an internal pore of the sintered metal bearing;
a radial dynamic pressure generation portion formed on an inner peripheral surface of the sintered metal bearing; and
a thrust dynamic pressure generation portion formed on an end surface of the sintered metal bearing on one side of the sintered metal bearing in an axial direction, an end surface of the sintered metal bearing on another side of the sintered metal bearing in the axial direction having a flat shape, wherein
an axial dimension L of the oil-impregnated sintered bearing is 0.8 mm or more and 1.8 mm or less,
a thickness dimension t of the oil-impregnated sintered bearing is 0.5 mm or more and 1.5 mm or less,
a ratio L/D2 of the axial dimension L to an outer diameter dimension D2 of the oil-impregnated sintered bearing is 0.24 or more and 0.6 or less,
a density ratio of the oil-impregnated sintered bearing is 86% or more and 92% or less,
an inner diameter dimension D1 of the oil-impregnated sintered bearing is 1.2 mm or more and 2.5 mm or less,
the outer diameter dimension D2 is 2.5 mm or more and 5.0 mm or less, and
the radial dynamic pressure generation portion includes a plurality of dynamic pressure generating grooves.

2. The oil-impregnated sintered bearing according to claim 1, wherein a ratio D2/D1 of the outer diameter dimension D2 to the inner diameter dimension D1 is 1.5 or more and 3.0 or less.

3. The oil-impregnated sintered bearing according to claim 1, wherein the inner diameter dimension D1 is 1.5 mm or more and 2.0 mm or less.

4. A fluid dynamic bearing device comprising:
an oil-impregnated sintered bearing according to claim 1;
a housing having an inner periphery to which the oil-impregnated sintered bearing is fixed;
a rotating body having a shaft inserted into an inner periphery of the oil-impregnated sintered bearing; and
a radial bearing portion that supports the shaft in a non-contact manner in a radial direction with a film of the lubricating fluid formed in a radial bearing clearance between an inner peripheral surface of the oil-impregnated sintered bearing and an outer peripheral surface of the shaft by a dynamic pressure action of the radial dynamic pressure generation portion.

5. The fluid dynamic bearing device according to claim 4, further comprising a first thrust bearing portion that supports the shaft in a non-contact manner in a thrust direction with the film of the lubricating fluid formed in a thrust bearing clearance between an end surface of the rotating body and the end surface of the sintered metal bearing on the one side in the axial direction by a dynamic pressure action of the thrust dynamic pressure generation portion, the end surface of the rotating body and the end surface of the sintered metal bearing on the one side facing each other in the thrust direction.

6. The fluid dynamic bearing device according to claim 5, wherein the end surface of the sintered metal bearing on the one side of the sintered metal bearing faces a disk portion of a hub portion of the rotating body in the thrust direction.

7. The fluid dynamic bearing device according to claim 5, further comprising a second thrust bearing portion that supports an end portion of the shaft facing an end surface of the housing in the axial direction in a contact manner in the thrust direction, the second thrust bearing portion supporting the end portion of the shaft with the end surface of the housing.

8. A motor comprising a fluid dynamic bearing device according to claim 4.

* * * * *